May 30, 1967 C. LE ROY CARPENTER ETAL 3,322,499
APPARATUS AND PROCESS FOR THE PRODUCTION OF METAL OXIDES
Filed Jan. 13, 1964
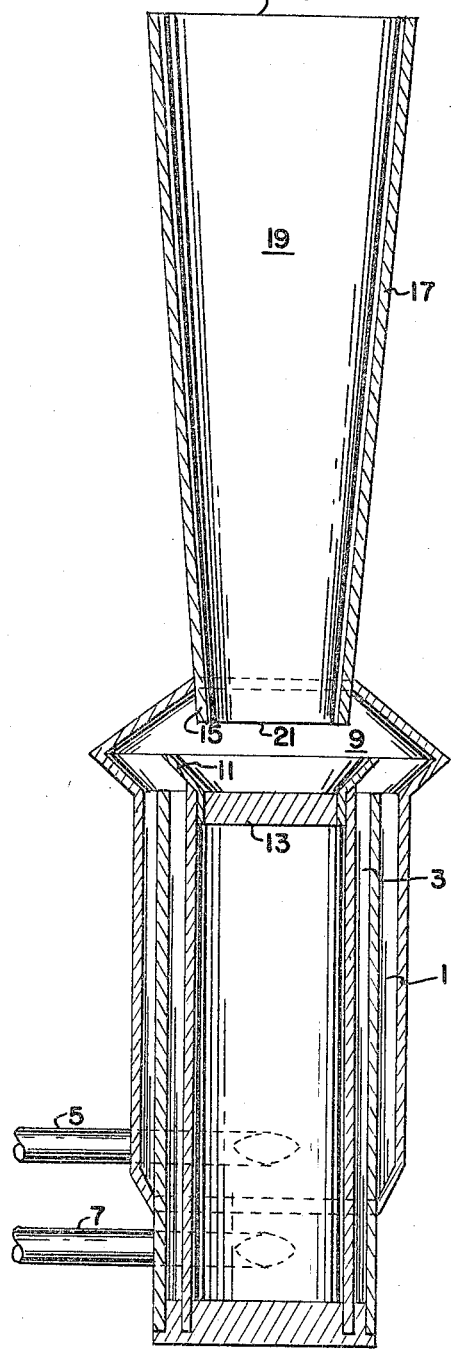
INVENTOR.
C. L. CARPENTER, C. B. WENDELL 3,322,499
APPARATUS AND PROCESS FOR THE PRODUCTION OF METAL OXIDES
Clifford Le Roy Carpenter, Wellesley, and Charles B. Wendell, Canton, Mass., assignors to Cabot Corporation, Boston, Mass., a corporation of Delaware
Filed Jan. 13, 1964, Ser. No. 337,383
5 Claims. (Cl. 23—202)

The present invention relates to novel burner apparatus and more specifically to novel apparatus for the production of pyrogenic metal oxides.

Production of pyrogenic metal oxides by oxidation at elevated temperatures, i.e. above about 1000° F., of a volatile metal compound such as a metal halide or oxyhalide is well known. Equation 1 below is believed to correctly illustrate the type of reaction involved when, for example, titanium tetrachloride is oxidized by a free-oxygen containing gas to produce pyrogenic titanium dioxide.

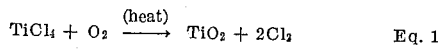

$$TiCl_4 + O_2 \xrightarrow{(heat)} TiO_2 + 2Cl_2 \qquad \text{Eq. 1}$$

The reaction illustrated by Equation 1 is not normally sufficiently exothermic to be self-sustaining, and accordingly heat is normally supplied by any suitable means although the burning of a fuel gas, such as carbon monoxide with a free-oxygen containing gas as illustrated in Equation 2 below is often preferred.

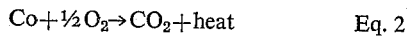

$$Co + \tfrac{1}{2} O_2 \rightarrow CO_2 + \text{heat} \qquad \text{Eq. 2}$$

The resulting overall reaction has been found to be generally suitable for use in the production of pyrogenic metal oxides such as titanium dioxide, zirconium dioxide, ferric oxide, silicon dioxide, stannic oxide, and the like; and particularly suitable in the production of finely-divided oxides of zirconium iron and titanium. Details of the processes are disclosed in numerous references such as U.S. Patents 2,488,439; 2,488,440 and 2,980,509; and in "Studies on Inorganic Fillers," by Gosta Flemmert published in 1953 by Darlarnes Tiduings-Och Boktrychkeri-AB, Sweden.

Copending U.S. application Ser. No. 320,879, filed Nov. 1, 1963, by Charles B. Wendell et al., discloses an improved process for the production of pyrogenic metal oxides which comprises charging at a linear velocity of between about 75 and about 350 ft./sec., a fuel gas, a metal compound in vapor form and free-oxygen containing gas into the smaller base portion of a relatively unobstructed zone having an essentially frusto-conical configuration. While the apparatus disclosed in said copending application constitutes a great advance in the art, it is at times desirable to dispose the frusto-conical reaction zone of said apparatus within or at least immediately adjacent a furnace. Due to the annuli which at least partially surround the reaction zone, this is not always convenient. The present invention contemplates novel burner apparatus which can readily be inserted within a furnace or the like.

Accordingly, it is a principal object of the present invention to provide novel apparatus suitable for the production of pyrogenic metal oxides.

It is another object of the present invention to provide novel burner apparatus.

Other objects of the present invention will in part be obvious and will in part appear hereinafter.

The above and other objects and advantages of the present invention will be more readily understood when reference is had to the accompanying drawing forming part hereof wherein the figure comprises a schematic diagrammatic sectional view of a preferred burner assembly of the present invention which comprises, axially or substantially axially disposed, at least two annuli provided with tangential inlets, a mixing chamber comprising deflection means defining a circuitous path therethrough, and a frusto-conical burner portion. In producing a metal oxide with the apparatus of the figure, a fuel gas, metal compound vapors and a free-oxygen containing gas are introduced into the annuli, the spinning streams exiting from the annuli flowing through the mixing chamber by a circuitous path, thereby being at least partially mixed therein, the resulting mixture subsequently flowing into the small base end of the frusto-conical burner portion.

One of the important features of the present apparatus resides in the circuitous path described in said mixing chamber which circuitous path is normally produced by "a gas deflection" means disposed between the small base end of the burner portion and the annuli, which obstructs the "view" between the burner portion and the annuli and thereby promotes substantial mixing. In accordance with the specific apparatus illustrated in the figure, for example, deflection means 11 promotes substantially better mixing than can be achieved in the absence thereof. In addition said deflection means reduces the likelihood of an explosive flashback or the occurreence of unstable flame.

In a typical metal oxide producing run, referring again to the figure, there is introduced into annuli 1 and 3 through tangentially oriented conduits 5 and 7, a fuel gas and a free-oxygen containing gas respectively (not each of said conduits terminate in any entry tangentially oriented in the same spin direction). Said gases course helically through their respective annuli and become at least partially mixed upon entering mixing chamber 9. The resulting spinning gaseous mixture then passes around deflection means 11 (essentially saucer-shaped) and small base end 15 of burner portion 17 and thence flows through throat 21 into reaction zone 19 wherein said gases are ignited, the resulting reaction preheating said reaction zone. Next, in addition to the free-oxygen containing gas, there is introduced into conduit 7, a metal compound in vapor form which together with the free-oxygen containing gas courses through annulus 3 and is mixed in chamber 9 with the fuel gas. The resulting mixture in due course enters reaction zone 19 wherein the corresponding metal oxide is produced. The metal oxide product flows out of reaction zone 19 by means of exit 23 and is collected by any suitable means.

The design and operating specifics of the apparatus of the present invention are not normally critical. However, it should be noted that normally it is important that the pressure drop within throat 21 be maintained greater than the pressure drop within mixing chamber 9. Failure to establish and maintain said pressure drop differential can lead to flame instability and flash-back of the flame. Moreover, it should be borne in mind that the linear velocity of the gaseous mixtures flowing into throat 21 should generally be maintained at greater than about 75 ft./sec. when carbon monoxide is utilized as the fuel gas (and proportionately higher when fuel gases having flame speeds higher than carbon monoxide are utilized). At velocities substantially below 75 ft./sec., overheating of the apparatus can occur. When operating conditions are such that linear velocities of substantially less than 75 ft./sec. are proposed for any extended period of time, it is recommended that auxiliary cooling such as by water cooling or any other suitable means of at least the frusto-conical burner portion of said apparatus be effected.

It is pointed out that, generally, the apparatus of the present invention, when utilized for the production of metal oxides, should be relatively obstructionless especially in the area of the reaction zone and should be designed to allow the metal oxide product to exit therefrom with as little obstruction as possible as said product while hot tends to deposit and crystallize upon obstructions. It is also pointed out that in order to allow the reaction involved in the production of the metal oxide to proceed substantially to completion, residence time within the reaction zone should be considered.

The materials from which the improved apparatus of the present invention can be fabricated are subject to considerable variation. Generally, any ceramic composition, metal or metal alloy which is substantially inert to the tempertures, reactants and products of reaction and is capable of withstanding the thermal shock is suitable. Specific examples of materials that are generally suitable for the fabrication of the apparatus of the present invention are nickel, aluminum, stinless steel, glass, vitreous silica, and the like. It should be noted that, generally, when different materials are to be used in the fabrication of said apparatus it is important that the coefficients of expansion of said materials be fully taken into account. Moreover, it should be borne in mind that although ceramic materials are often satisfactory, ceramic materials often possess relatively low resistance to thermal shock, a factor often encountered in processes directed towards pyrogenic metal oxide production wherein flame temperatures above about 3000° F. are not unusual.

Generally, any metal compound that is volatilizable at temperatures below about 1000° F. is suitable for the purposes of the present invention. Definitely preferred, however, are metal halides and oxyhalides such as titanium tetrachloride, zirconium tetraiodide, titanium tetrabromide, silicon tetrachloride, titanium oxychloride, aluminum trichloride etc., and mixtures thereof. The metal compounds can be introduced into the burner in any suitable manner such as alone, in combination with the free-oxygen containing gas, or with the fuel gasses or any component thereof.

Free-oxygen containing (i.e. gases containing uncombined oxygen) suitable for the purposes of the present invention are generally obvious. Preferred for use in the process of the present invention, however, are dry oxygen and/or dry air.

Fuel gases, i.e. gases utilized in preheating and/or supplying heat to the burner, which are suitable for the purposes of pyrogenic metal oxide production are generally well-known. Specific examples of fuel gases that can be utilized are methane, propane, butane, carbon monoxide, sulphur chlorides, sulphur vapor and the like. Carbon monoxide, however, has generally been found to be highly preferred because it is relatively readily available and because in producing titanium dioxide by the oxidation of titanium tetrachloride, it is generally desirable that fuel gases containing hydrogen be avoided or utilized only in limited quantities. Moreover, it is pointed out that when fuel gases having a flame speed higher than that of carbon monoxide with oxygen are utilized linear velocities proportionately higher than between about 75 and 350 ft./sec. must normally be utilized in order to achieve similar results.

It is pointed out that in order to efficiently accomplish simultaneously both of the reactions illustrated by Equations 1 and 2 or their equivalents it is normally necessary to introduce into the burner at least about sufficient free-oxygen containing gas to react stoichiometrically with the metal compound and the fuel gas introduced thereinto. Preferably, a small excess of free-oxygen containing gas is introduced.

A better understanding of the present invention can be had when reference is made to the following Example which, however, is illustrative in nature and therefore is not intended to limit the scope of the present invention in any way.

*Example 1*

To the outer annulus 1 of a slightly preheated aluminum apparatus of the type illustrated in FIGURE 1, having a diameter at the large base end of wall 17 of 1 inch and a diameter at the small base end of wall 17 of ½ inch, the total length of wall 17 being 3 inches, the diameter of mixing chamber 9 at its greatest point being 1⅜ inches, and annuli 1 and 3 being 1/16 inch wide, there is charged carbon monoxide at a rate of about 200 s.c.f.h. Simultaneously, oxygen at a rate of about 200 s.c.f.h. is introduced into the inner annulus. The resulting mixture is ignited within reaction zone 19 and the reaction is allowed to continue. Next, volatilized titanium tetrachloride is introduced into the inner annulus at a rate of about 25 s.c.f.h. Pigment grade titanium dioxide is produced in the reaction zone and exists therefrom by way of exit 23. Moreover, after 24 hours of operation, no substantial accretion has occurred on the inner surface of wall 17.

Obviously, many changes can be made in the above example, description and accompanying drawing without departing from the scope of the invention. For instance, the free-oxygen containing gas, the metal compounds, and fuel gas(es) can be conveyed separately into the mixing chamber through separate annuli. Further, the annuli need not be cylindrical in form. For instance, we have found frusto-conical annuli (smaller bases being disposed towards the small base end of the reaction zone) to be entirely satisfactory. Moreover, other fuel gases can be used either in combination or separately although it should be borne in mind that the use of hydrogen containing fuel gases is not generally desirable where pigment grade titanium dioxide is the product to be produced.

When it is desirable that the reactants entering the burner be diluted without greatly disturbing the mass flow rates of the gases, said reactants can be diluted with an inert gas, such as nitrogen or helium prior to or during the charging of said reactants to the burner. Thus, it is possible to retain a given mass flow rate while reducing the flow of oxygen containing gas, metal compound and/or fuel gases.

Also, although for the purposes of clarity and brevity no mention of nucleating agents was made in the above example or description, it is well known in the art that it is often desirable to "seed" a metal oxide producing reaction zone with a nucleating agent, such as, for instance, in the production of titanium dioxide, aluminum trichloride. Additives which are generally added to the burner in minor amounts, i.e. additives which comprise less than about 10% by volume of the total gas flow, can also be added to the flame separately, that is tangentially, as part of a spinning mixture, or, if desired, axially, for instance, through base 13 of deflection means 11.

Accordingly, it is intended that the disclosure be regarded as illustrative and as in no way limiting the scope of the invention.

What we claim is:

1. An improved burner assembly which comprises axially positioned a mixing chamber comprising gas deflection means to provide a circuitous path through said chamber, at least two annuli opening into one end of said mixing chamber, said annuli being provided with tangential entries and being closed at the other end, and a frusto-conical burner portion, the small base end of said burner portion opening into the other end of said mixing chamber.

2. An improved burner assembly which comprises axially positioned a mixing chamber comprising gas deflection means to provide a circuitous path through said chamber, at least two annuli opening into one end of said mixing chamber, said annuli being provided with tangential entries and being closed at the other end, and a frusto-conical burner portion, the small base end of said burner portion protruding and opening into the other end of said mixing chamber.

3. An improved burner assembly which comprises axially positioned a mixing chamber comprising gas deflection means to provide a circuitous path through said chamber, at least two frusto-conical annuli, the small base ends thereof opening into one end of said mixing chamber, said annuli being provided with tangential entries and being closed at the larger ends, and a frusto-conical burner portion, the small base end of said burner portion opening into the other end of said mixing chamber.

4. A process for producing a pyrogenic metal oxide which comprises providing at least one spinning stream comprising carbon monoxide, and at least one spinning stream comprising oxygen, introducing to one of said streams vapors of a metal compound, at least partially mixing said streams by causing them to flow a circuitous path through a mixing zone and flowing the resulting spinning mixture into the small base end of a frusto-conical reaction zone at a minimum linear velocity of about 75 feet per second, and at a pressure drop at the entrance of said small base end greater than the pressure drop in said mixing zone.

5. The process of claim 4 wherein said metal compound is a titanium halide.

References Cited
UNITED STATES PATENTS

| | | | |
|---|---|---|---|
| 2,576,228 | 11/1951 | Kinnaird | 23—277 |
| 2,822,411 | 2/1958 | Braconier et al. | 23—277 X |
| 2,823,982 | 2/1958 | Saladin et al. | 23—202 |
| 2,848,305 | 8/1958 | Lehrer et al. | 23—277 |
| 2,890,929 | 6/1959 | Rummert | 23—1 |
| 3,054,831 | 9/1962 | Samples et al. | 23—277 X |
| 3,069,282 | 12/1962 | Allen. | |

OSCAR R. VERTIZ, *Primary Examiner.*

E. STERN, *Assistant Examiner.*